United States Patent [19]

Peterson et al.

[11] Patent Number: 5,083,140
[45] Date of Patent: Jan. 21, 1992

[54] MULTIPLE CHARGE IMAGES INITIATION WITH SCAN SYNCHRONIZATION

[75] Inventors: Ronald C. Peterson, Shoreview; Keith E. Jasperson, Maplewood; Robert J. Schilling, Arden Hills, all of Minn.

[73] Assignee: Minnesota Mining and Manufacturing Company, St. Paul, Minn.

[21] Appl. No.: 507,378

[22] Filed: Apr. 10, 1990

[51] Int. Cl.⁵ .............................................. G01D 9/42
[52] U.S. Cl. ................................. 346/107 A; 346/108; 346/157; 346/160; 346/1.1
[58] Field of Search ................. 346/107 A, 108, 153.1, 346/154, 157, 160, 1.1

[56] References Cited

U.S. PATENT DOCUMENTS

| | | | |
|---|---|---|---|
| 3,698,006 | 10/1972 | Ovshinsky | 346/74 P X |
| 3,898,627 | 8/1975 | Hooker et al. | 346/160 |
| 4,566,043 | 1/1986 | Tamura | 346/108 X |
| 4,667,227 | 5/1987 | Ikeda | 358/75 |
| 4,680,625 | 7/1987 | Shoji et al. | 358/80 |
| 4,694,502 | 9/1987 | Ozawa et al. | 382/17 |
| 4,703,346 | 10/1987 | Bierhoff | 358/75 |
| 4,721,969 | 1/1988 | Asano | 346/157 |
| 4,728,983 | 3/1988 | Zwadlo et al. | 355/4 |
| 4,878,110 | 10/1989 | Maruyama et al. | 385/75 |
| 4,937,664 | 6/1990 | Chiku et al. | 358/75 |
| 4,972,210 | 11/1990 | Woo | 346/108 |
| 4,975,626 | 12/1990 | Yagi et al. | 346/160 X |

Primary Examiner—Benjamin R. Fuller
Assistant Examiner—Randy W. Gibson
Attorney, Agent, or Firm—Kinney & Lange

[57] ABSTRACT

A registration system for repeatably beginning modulation of a scanning laser beam at a selected initial location on a rotatable drum through initiating a rotation of the drum from a known starting position in synchronism with the laser scan so that the initial location is accurately brought under the laser beam as modulation begins.

13 Claims, 4 Drawing Sheets

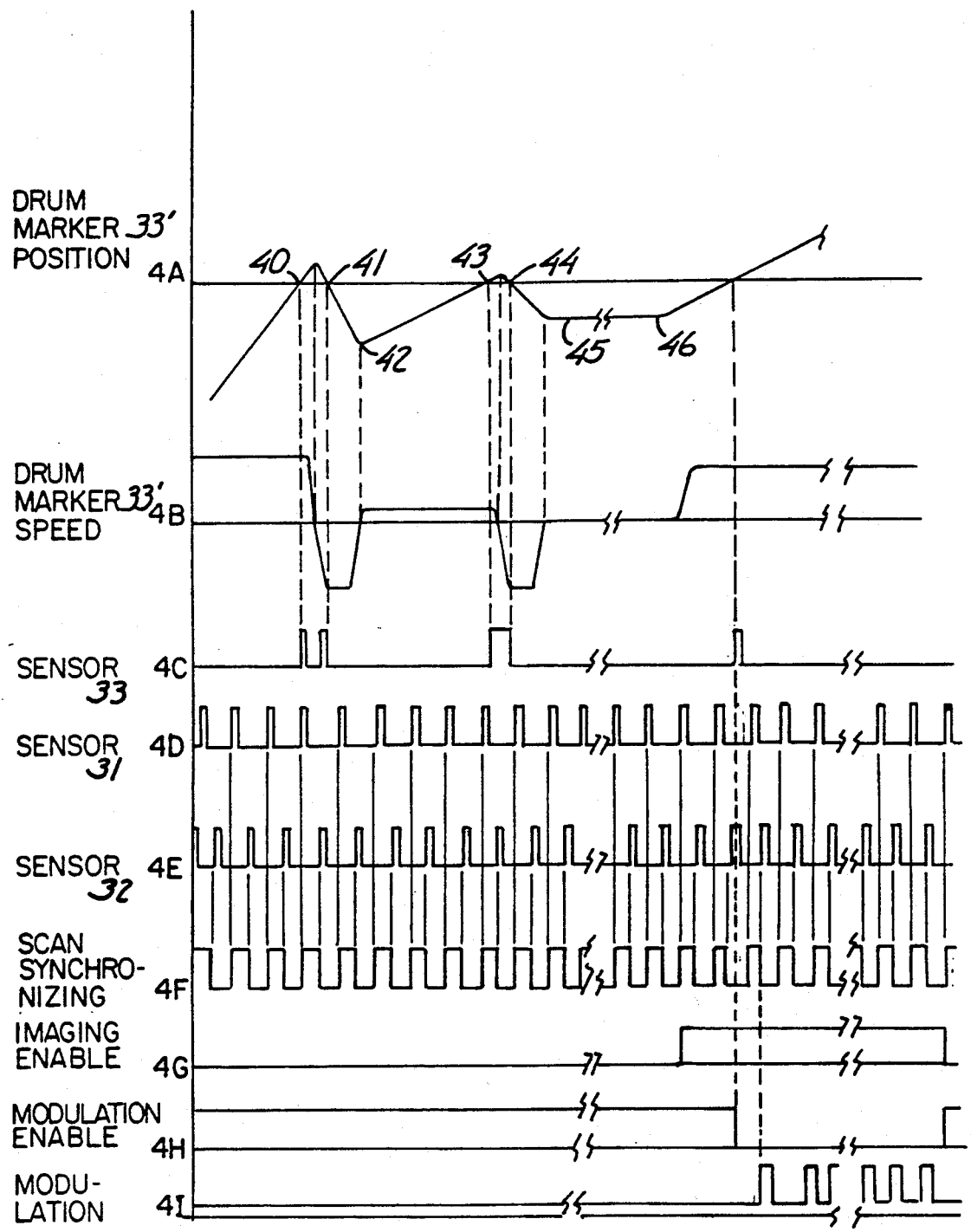

MULTIPLE CHARGE IMAGES INITIATION WITH SCAN SYNCHRONIZATION

BACKGROUND OF THE INVENTION

The present invention relates to electrophotographic reproduction systems and, more particularly, to color electrophotographic reproduction systems.

Electrophotographic reproduction equipment is finding increasing use. This is particularly so for full color reproductions which can be provided with very high quality using electrophotographic methods. Such methods are used for both copiers and for very much higher resolution color proofing printers.

An example of such a system is shown in FIG. 1 in a highly schematic form. The electrophotographic process is practiced on the outer cylindrical surface of a drum, 10, that is selectively rotated by a stepper motor, 11, under the control of a control system, 12. Drum 10 is formed of a metal core, 13, which can rotate in journals supported on a frame, not shown, about a rotation axis that is essentially its axis of symmerty with respect to its cylindrical outer surface. The cylindrical outer surface portion of metal core 13 has a plastic layer, 14, as a substrate wrapped therearound. An electrically conductive surface layer, 15, is provided on plastic layer 14, and an organic photoconductor, 16, is coated on that conductive surface which is electrically connected to ground through metal core 13.

The circumference of the cylindrical surface of drum 10 has been selected to be 846.667 mm is this example. A typical surface velocity of the exposed surface of drum 10 during a reproduction cycle would be about 5 mm/sec. Stepper motor 11 has been chosen in this example to provide 200,000 steps per complete revolution of drum 10.

In the electrophotographic reproduction process, organic photoconductor 16 is charged to a surface potential of from typically 250 V to 400 V positive with respect to ground, selected portions of that surface thereafter being discharged by a modulated, scanning laser beam to a lower potential at those locations encountering sufficient beam intensity under the modulator signal to result in forming a desired electric charge pattern, or potential pattern, on that surface. This pattern is provided in accord with a color separation signal which specifies the desired locations of a constituent color in a desired resulting printed image which is typically formed of three or four such attract a selected toner having a desired constituent color, this attracted toner subsequently, being transferred from the surface of drum 10 along with other colored toners to the surface of the medium on which the printing is to occur to form a printed image.

An electrifier, 17, such as a scorotron supplies electric charge to the entire adjacent surface portion of photoconductor 16 to cause that portion to reach the above peak surface potential prior to its reaching the region of intersection with the scanning laser beam. A toning developer arrangement, 18, contains six identical units, 19, each containing an alternative one of the four constituent color liquid toners that might be each used to form a corresponding subimage enroute to forming a complete color printed image plus two other alternative color toners for any special effects desired. The four colors typically are black, cyan, magenta, and yellow liquid toners.

In each unit 19, there are pumping means to supply the toner to the surface of a moving band, 20, provided in each, this band being capable of being rotated across the outer surface of drum 10 parallel to the rotation axis thereof. A motor arrangement, 21, is controlled by control unit 12 to position a selected one of toner units 19 so that a surface of the band 20 therein engages the surface of photoconductor 16 of drum 10 resulting in the toner in that unit being attracted to this surface of photoconductor 16.

A selected toner unit 19 has its band 20 charged to a voltage from 150 V to 200 V positive with respect to ground which charges the toner pumped thereover from one side of the band. A vacuum provision arrangement is provided in each toner unit 19 on the other side of the band therein to remove excess liquid toner.

The scanning laser beam, modulated by a corresponding color separation signal to provide the associated electric charge pattern on the surface of photoconductor 16 by selectively discharging that surface, does so successively for each of toner units 19. Thus, an initial charge pattern is provided on photoconductor 16 followed by a corresponding toner deposition step, and then a new charge pattern is provided on photoconductor 16 under the previous toner or toners each time there is a completion of the deposition of the toner for a previous charge pattern until the final toner to be used has been deposited. Each of the corresponding toners attracted to its charge pattern is deposited as a subimage and accumulated on photoconductor 16 to form the complete toner image.

This complete toner image is subsequently transferred onto an intermediate medium formed by a coated polyester web, 22, which coating contains a thermally sensitive adhesive layer and a release/ protective layer. Web 22 is forced against layer 16 on drum 10 by a heated roller, 23, which results in a transfer of the accumulated toner on photoconductor 16, to web 22 through its being picked up by the adhesive layer therein. A later step results in transferring the accumulated toner, the adhesive layer and parts of the release/protective layer from web 22 onto the medium on which printing is to occur, such as paper, to thereby provide an up to six color half-tone printing result.

A laser electromagnetic radiation source arrangement, 24, under the control of control unit 12, supplies the laser beam for selectively discharging the surface of photoconductor layer 16 drum 10 which is modulated by control unit 12 using such corresponding color separation signals as are obtained from a memory, 25. Laser beam source 24 correspondingly supplies a modulated laser beam, 26, through an optical beam conditioning unit, 27, to impinge on an eight-faceted, rotating polygon mirror arrangement, 28, which is rotated by a motor, 29, again operated by control unit 12. Laser beam 26 is reflected from successive facets of rotating polygon 28 to then pass through further processing optics, 30, so as to repeatedly scan from left to right across that portion of the cylindrical surface of photoconductor 16 and drum 10 that is rotated thereunder.

This arrangement involving laser beam 26 is more clearly seen in FIG. 2. There, the scan range of laser beam 26 is shown from one of the facets of rotating polygon 28 by a pair of dashed lines, 26', this range being set by a pair of laser beam radiation detectors, 31 and 32, each formed by a mirror and photosensor arrangement in a fixed position with respect to each other and to the rotation axis of drum 10. Each of detectors 31 and 32 provide an electrical signal, corresponding to any such radiation impinging thereon, to control unit 12 to indicate when scanning laser beam 26 is at the beginning of its scan range, that is, at sensor 31, and when it is at the end of its scan range, or sensor 32.

Motor 29 can rotate polygon 28 at a selected rate between 2,000 and 4,000 revolutions per minute (rpm) with each revolution providing eight scans corresponding to the eight facets of this polygon. The rotation of polygon 28 is controlled by control unit 12 in a phase-lock loop arrangement to thereby provide sufficient angular velocity control of polygon 28 so as to have a repeatability on the order of 62 parts per million (ppm) maximum deviation over relatively long periods of time. This polygon velocity will have a deviation of only 42 ppm over periods of 20 to 30 minutes during which a sequence of color printings, each corresponding to a color separation signal, will be made to form a single printed color image.

At 4,000 rpm, rotating polygon 28 will provide a scan line every 1.875 ms. For the rotation data and size data of drum 10 given above, drum 10 will revolve once in every 166.667 seconds so that a stepping motor providing 200,000 steps per revolution will require 0.833 ms per step. Thus, drum stepping motor 11 will provide 2.25 steps per scan line giving a 4.17 $\mu$m change in the position of the surface of drum 10 per step of stepping motor As a result, there is the possibility of being able to distinguish between scan lines sufficiently well so that the registration of successive color separation subimages for forming a color printed image can meet a $\pm 10$ $\mu$m requirement if the relative positional relationship between rotating polygon 28 and rotating drum 10 can be established with sufficient accuracy.

There is a strong desire to meet such a registration requirement to provide high quality printing. Such a result is obtained if laser beam 26 can be positioned so accurately on the surface of drum 10, at the start of each color separation cycle needed to form an image, that it is never displaced from the desired initial location by more than half the spot size of that beam. The beam spot size of laser beam 26 in its longest dimension along the direction of rotation of drum 10 is typically set at 20 $\mu$m to give sufficient resolution and yet maintain a reasonably cost effective optical system. Thus, there is a strong desire to start each successive charge pattern on drum 10, provided by the discharge or exposure of photoconductor 16 by laser beam 26 and corresponding to each color separation printed subimage used in forming a color printed image, at a point within $\pm 10$ $\mu$m of the desired start location.

SUMMARY OF THE INVENTION

The present invention provides for a registration system which can repeatably begin modulation of a scanning laser beam at a selected initial location on an outer surface of a drum rotatable about an axis in each of a succession of selected rotations. The laser beam is scanned across the outer surface of the drum, sensing each time the beam leaves a reference location in a fixed position with respect to the drum axis. By initiating a rotation of the drum from a selected starting position in synchronism with the scanning laser and sensing when the drum has reached a reference location, the selected initial location on the drum can be accurately rotated under the laser beam at the time modulation thereof it is desired to start. Modulation of the laser beam is permitted to occur for a selected occurrence of the laser beam leaving the scan reference location following the drum reaching the reference location, such as the first time the laser beam leaves the scan reference location thereafter.

BRIEF DESCRIPTION OF THE DRAWINGS

FIG. 4 shows a timing diagram for the system portion shown in FIG. 3.

DETAILED DESCRIPTION OF THE PREFERRED EMBODIMENTS

Figure 1:
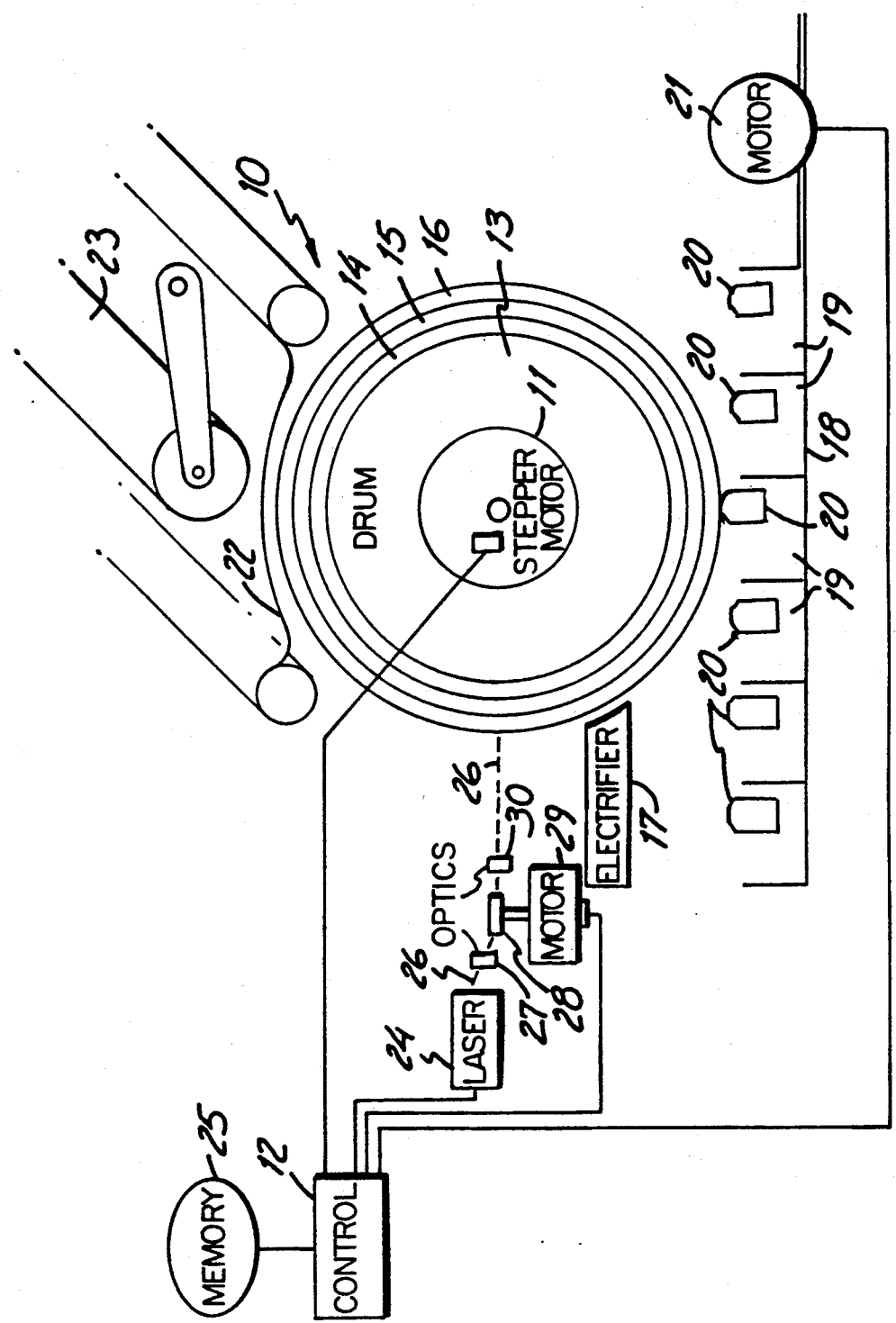
FIG. 1 shows a system in which the present invention is to be employed.
Figure 2:
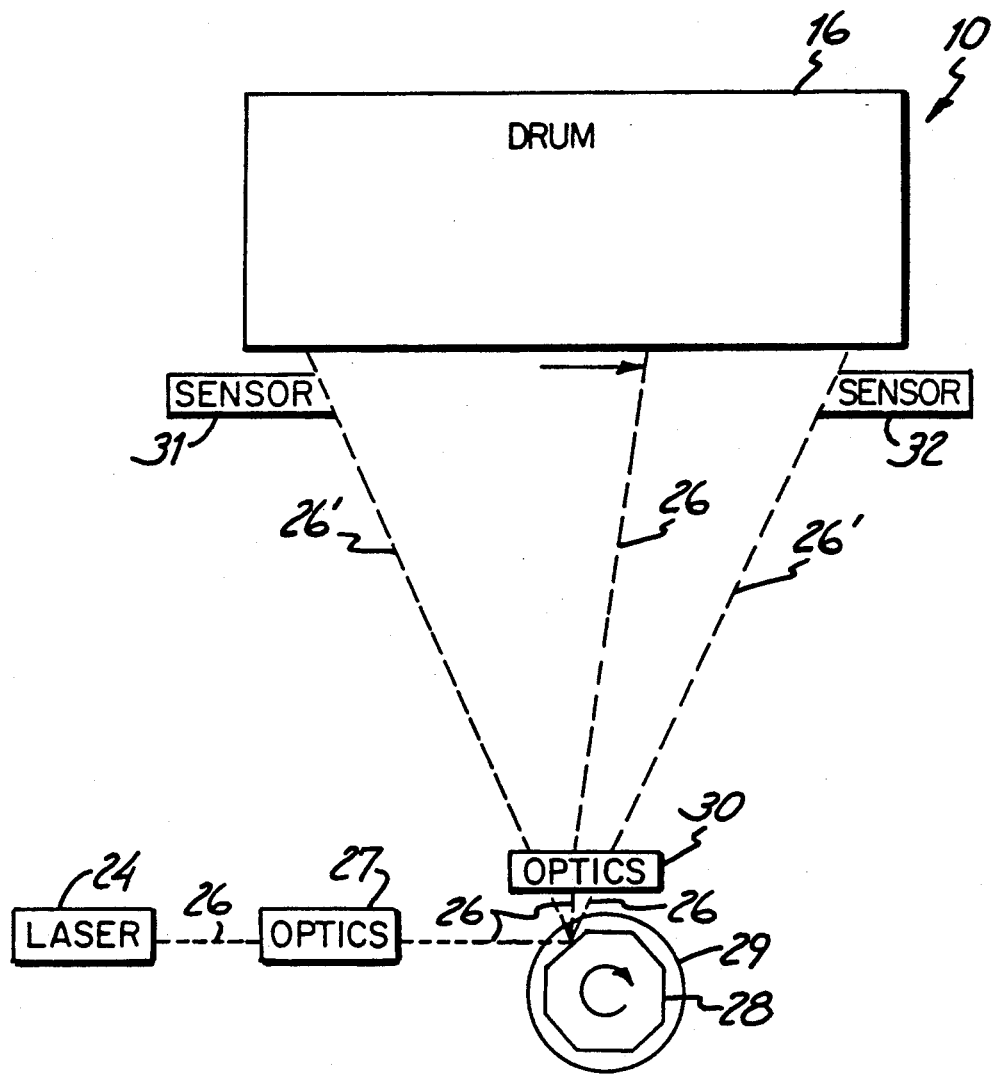
FIG. 2 shows a portion of the system of FIG. 1.
Figure 3:
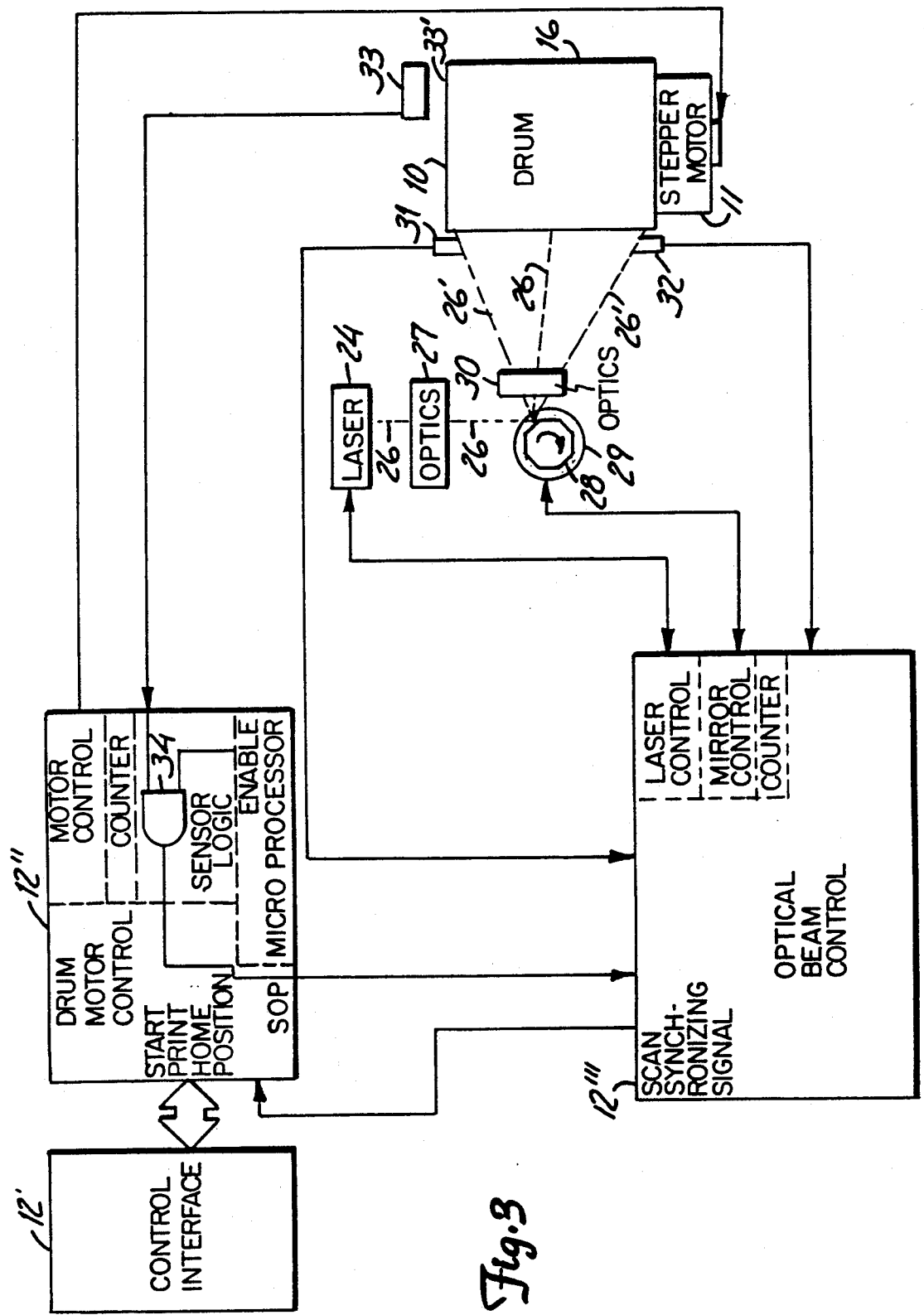
FIG. 3 shows a block diagram of a portion of the system in FIGS. 1 and 2 embodying the present invention.

FIG. 3 shows a block diagram which has been expanded to include not only the laser scanning system of FIG. 2, but also control components from the system of FIG. 1 with some of the signal connections among them. Similar components in each figure have common designations in each figure. FIG. 3 shows an additional sensor over the system portion shown in FIG. 2, and shows portions from control system 12 of FIG. 1.

Thus, a position sensor, 33, has been added for purposes of sensing the passing of a reference marker, 33', on drum 10 by a selected reference position fixed with respect to the rotation axis of drum 10 as represented by having sensor 33 mounted thereat. Typically, sensor 33 emits a light beam which is reflected by reference marker 33' on drum 10 to be picked up again in sensor 33 as a basis for indicating when marker 33' passes sensor 33. This information is transmitted by sensor 33 to a drum motor control unit, 12'', as part of control system 12. Other blocks are shown in FIG. 3 as part of control system 12, including a control interface unit, 12', where operator commands are received and passed on for execution by remaining portions of the system, and an optical beam control unit, 12''' directing operation of laser source 24 and rotating polygon mirror 28.

Providing an accurate and repeatable position for laser beam 26, supplied by laser source 24, at the start of each modulation thereof by a corresponding color separation signal, for forming a succession of subimages, requires synchronizing the positions of drum 10 and a facet of rotating polygon mirror 28. They must come to the proper relationship with one another at the time modulation of the laser beam is initiated. If the position of the facet reflecting beam 26 from laser arrangement 24 toward drum 10 is not accurately set at the time such a modulation begins, there could be at that time a range of possible positions of that facet. Thus, laser beam 26 could be anywhere in its angular deflection range in one scan line across the outer surface of drum 10.

The lateral position across the outer surface of drum 10 of the initial location at which modulation of laser beam 26 is desired to start is typically far to the left in the angular range between dashed lines 26'. As a result, once past this initial location due to an uncontrolled setting of the position of this facet, beam 26 could only reach the desired angle coinciding with the lateral position of the initial location after angularly deflecting sufficiently far to reach the opposite end of the angular deflection range, and then begin scanning again until the desired angle is reached. In the meantime, drum 10 would have rotated somewhat beyond its previous angular position around its path at which the initial location would be under beam 26 so that by the time the deflected beam reaches its desired initial angle, the desired initial location on drum 10 will have gone by. Thus, beam 26 will intersect the surface at its desired angle somewhat behind the desired starting location on the outer surface of drum 10. That is, the beam could be as much as an entire scan line behind its desired location when reaching its desired angular position leading unavoidably to beam modulation start positions varying from the desired initial position, and from each other in successive subimage formations.

This difficulty is avoided in the system of FIG. 3 by the use of sensor 33 to indicate the position of drum 10 just prior to the desired starting place on its surface coming to the point where it can be reached by the scanning beam from laser arrangement 24. Similarly, the position of this laser beam is sensed for this purpose by sensor 31 just before it reaches the desired starting point on the surface of drum 10.

This operation can be best understood in connection with the timing graphs of FIG. 4. First of all, to assure that the desired starting point on the outer surface of drum 10 comes to the position where the laser beam from laser arrangement 24 is to scan over it at the time modulation of that beam is to begin, drum 10 is pre-positioned at a desired angular location thereof (a "home" position) before it is brought up to speed in forming a color separation charge pattern for a subimage to be used in forming a color printed image. This placing of drum 10 in a "home" position can occur at the end of a previous operation, or can occur in the initial steps of a subsequent color separation subimage production process.

Assuming that drum 10 is out of position, graph 4A initially shows the position of drum 10 is it is being rapidly rotated forward until drum marker 33' reaches the reference position at which sensor 33 is mounted. The position where drum marker 33' is directly across from the reference position of sensor 33 is defined to be zero angular position of drum 10 with respect to that reference. Drum 10 reaches this zero angular reference value position at the point in graph 4A designated 40, and sensor 33 provides a corresponding output pulse shown in graph 4C.

Drum 10 is thereafter slowed, stopped and reversed in rotation direction as is shown in graphs 4A and 4B, this latter graph showing the angular speed of drum marker 33'. Drum marker 33' passes through the zero position again at point 41 to result in a second pulse from sensor 33 shown in graph 4C (which shows the zero reference occurring at the trailing edge of the pulse because the leading edge of marker 33' is defined as the one setting the reference position). Drum 10 continues in the reverse direction until marker 33' reaches an angular position significantly behind the zero reference location where drum 10 is again slowed and brought to a stop at point 42 in graph 4A to again reverse its direction of rotation.

Thereafter, drum 10 begins to rotate in a forward direction again but at a much slower speed until marker 33' again reaches the zero reference value at point 43 in graph 4A, at which point sensor 33 provides a signal with a rising edge shown in graph 4C. Because of the much reduced velocity in this second approach to the zero reference level, drum 10 overshoots the reference position very slightly and much less than it did in the previous approach shown between points 40 and o 41 in graph 4A (such that marker 33' never entirely passes the reference position of sensor 33 leading to a single wide pulse in graph 4C). At this position, a counter shown in drum motor unit 12", which counts pulses to stepper motor 29, is set to zero to thereby establish the zero reference for drum 10 in the electronic control circuitry.

Once again, drum 10 is thereafter slowed, stopped and its rotation reversed back through the zero reference value at point 44 to the "home" position indicated by the horizontal graphic portion designated 45 in graph 4A. This "home" position is an angular position measured by a selected number of stepper motor 29 pulses used in moving marker 33' behind the zero reference position in graph 4A. Thus, drum 10 is carefully placed in a selected initial or "home" position before beginning a succeeding color separation subimage production step.

In the meantime, laser beam 26 is repeatedly scanning across the outer surface of drum 10 from left to right, and intersecting sensors 31 and 32 at the extremes of its scanning angular range. Each time sensor 31 is intersected by laser beam 26, there is an output signal pulse therefrom shown in graph 4D. Similarly, there is an output signal pulse from sensor 32 each time laser beam 26 intersects that sensor, which is shown in graph 4E. Graphs 4D and 4E, however, are purposely not representative of the actual pulse rates from sensors 31 and 32 since, on the time scale of the motion of drum 10 shown in graph 4A, the rapidly repeated pulses from sensors 31 and 32 would form a solid line across the graph. Thus, for purposes of clarity, the pulse rates from sensors 31 and 32 are much slowed in graphs 4D and 4E from that actually used in practice to aid in clarifying the operation of the present invention.

The pulse sequences from sensors 31 and 32 are supplied to a flip-flop (not shown) in optical beam control unit 12" to set and reset that flip-flop. As a result, the output of that flip-flop provides a scan synchronizing signal shown in graph 4F. Since the signals from sensors 31 and 32 are supplied to optical beam control 12''', this scan synchronizing signal is generated at an output of that control unit from which it is supplied to drum motor control unit 12". Hence, the information as to scanning laser beam 26 reaching the ends of its angular scanning range is thereby communicated to drum motor control unit 12".

In this standby condition, the next color separation production is begun by a command from an operator entered into control interface unit 12' which is then communicated to drum motor control unit 12" In FIG. 4, this is assumed to take place after the first break in the time axis of each of the graphs contained therein with drum 10 previously placed in the "home" position.

Once the operator's command from control interface unit 12' reaches drum motor control unit 12", drum 10 is started in a forward rotation shown at point 46 in graph 4A, increasing its angular speed until a selected imaging speed is reached as indicated by the horizontal line designated 47 in graph 4B. Note that the start of motion of drum 10 at point 46 is forced to occur synchronously with the falling edge in a scan synchronizing signal in graph 4F, i.e. in synchronism with laser beam 26 leaving sensor 31.

Because rotations of drum 10 can be caused to occur for several purposes other than to begin a color separation subimage production step, the microprocessor in drum motor control unit 12" keeps track of the purpose selected. If a color separation subimage production step has been selected by an operator at control interface unit 12', this microprocessor provides an enabling signal that goes from a low voltage logic state to a high voltage logic state before modulation of laser beam 26 can occur. This enabling logic signal, shown in graph 4G, is shown there to make this logic transition in the example of operation given in FIG. 4 after the first break in the time axes of the graphs of that figure at an arbitrary point therealong after drum 10 has reached a steady speed. However, this logic transition does occur prior to drum marker 33' reaching the zero reference position.

Because drum 10 is carefully brought up to the speed selected at the horizontal graph segment 47 in graph 4B in a highly controlled manner from a known "home" position by an accurately controlled stepper motor 11, the speed and position graphs on the right of the first break in the time axes of the graphs in FIG. 4 are highly repeatable. This repeatability will, at least, be true over several runs of drum 10 made in a period measured in minutes or fractions of an hour to an hour, that is, over the time required to perform four color separation subimage production steps required to form a printed color image. Thus, because drum 10 leaves the "home" position in synchronism with the falling edge of a scan synchronizing signal pulse in graph 4F, the number of scan synchronizing pulses which occur between drum 10 leaving its "home" position and the desired initial modulation position coming under laser beam 26 will repeat for each subimage production step leading to an image.

Further, since drum 10 begins moving toward its desired speed at the falling edge of a scan synchronizing signal pulse, the desired initial modulation location on drum 10 will be known to be coming into the next row across the outer surface of drum 10 to be scanned under laser beam 26, and with the facet of rotating polygon 28, causing the scanning of this row, being very close to a known position at that time. Hence, laser beam 26 will be at an essentially known position along that scan row at the time the desired initial modulation location comes under that row so that the desired initial modulation location can be predictably reached by laser beam 26. Thus, the desired initial modulation location on the outer surface of drum 10 can be the actual initial modulation location very repeatably for each of the three to six successive color separation subimage production steps which can be chosen to form a color printed image.

Specifically, as drum 10 continues its forward rotation from the "home" position, drum marker 33' will eventually pass the reference position across from sensor 33 so that a pulse is provided by sensor 33 to drum motor control unit 12". This pulse is shown in graph 4C to the right of the first time break in the time axis thereof. The occurrence of this pulse in the output signal of sensor 33, shown in graph 4C, is supplied by sensor 33 to an input of drum motor control 12" where it is provided as an input signal to a circuit that performs an AND logic function in the sensor logic of that control unit. This AND logic function is represented by an AND logic gate, 34, in FIG. 3 although this is typically a simplified representation of the control circuit used, one which is under the control of the microprocessor in control unit 12". The other input for the circuit performing the AND logic function (and for representational AND gate 34) receives the imaging enable signal shown in graph 4G from the microprocessor in drum motor control unit 12" as indicated above. As previously indicated, the imaging enable signal of graph 4G has gone from a low voltage logic state to a high voltage logic state and so, with the occurrence of the pulse in sensor signal 33, the logic requirement of AND gate 34 is satisfied. As a result, the output of AND gate 34 shifts from a low voltage logic state level to a high voltage logic state level.

This signal from the output of AND gate 34 is supplied to optical beam control unit 12'''. The AND gate 34 output signal is used to activate a modulation enable signal in optical beam control unit 12''', the state of this signal changing from a high voltage logic state to a low voltage logic state and remaining there for the duration of the modulation occurring for a color separation subimage production step. This modulation enable signal is shown in graph 4H in FIG. 4 where it is shown to change states, as just described, to the right of the first time break in that graph at the point of coincidence of the imaging enabling signal in graph 4G being in a high voltage logic state and the occurrence of the pulse from sensor 33 in graph 4C.

Upon this occurrence of logic state change in the modulation enable signal of graph 4H, the modulation of laser beam 26 is allowed to proceed. However, this modulation does not occur immediately but is instead synchronized with the position of laser beam 26 through detecting its leaving an intersection with sensor 31 to thereby indicate the beginning of a new scan. Thus, the position of rotating polygon 28, located at the known angle it has when laser beam 26 reflecting therefrom ends an intersection with sensor 31, is synchronized with the position of drum 10 which is at a known angular position when marker 33' is across from sensor 33. Modulation of laser beam 26 is chosen to begin at the first falling edge of a pulse in the scan synchronizing signal of graph 4F after the occurrence of the pulse in sensor 33, this pulse indicating drum 10 has moved to the proper position to present the desired initial modulation location on its surface to laser beam 26.

This start of modulation can be seen in the signal shown in graph 4I of FIG. 4. Laser beam 26 is always kept in existence but at a low intensity level in those time periods when it is not being modulated by information obtained from a color separation signal obtained from storage in memory 25 which provides the information for modulating this beam. At the start of modulation, the intensity of laser beam 26 is subject to being substantially increased to the full intensity to be used, and it thereafter varies between the low intensity level being used in standby times and this full intensity level in accord with the information supplied in the color separation signal, as can be seen in graph 4I.

Modulation of laser beam 26 continues for the duration of the scanning necessary to set the charge levels on the outer surface of drum 10, by discharging photoconductor 16, for a color separation subimage production step corresponding to the color separation signal upon which this modulation is based. Thus, this modulation continues for a relatively long duration, and so a second time break is shown in the time axes to the far right in the graphs of FIG. 4 so that the end of the modulation activity can be shown for a color separation subimage production step. The modulation signal in graph 4I is shown decreasing to the standby intensity level somewhat before the end of the modulation time in the color separation production step as it is assumed that a border area with little color therein has been reached in the color separation involved in this step for the subimage being produced. The modulation period for a color separation production step is actually ended by the imaging enable signal of graph 4G going from the high logic state to the low logic state as shown to the far right of that graph in FIG. 4. At this point, AND gate 34 will also change its output logic in going from a high voltage value logic state to a low voltage value logic state, and correspondingly modulation enable signal of graph 4H will change from a low voltage logic state to a high voltage logic state preventing any further modulation of laser beam 26.

Although the present invention has been described with reference to preferred embodiments, workers skilled in the art will recognize that changes may be made in form and detail without departing from the spirit and scope of the invention.

What is claimed is:

1. A method for repeatably beginning modulation of a scanning laser beam at a selected initial location on an outer surface of a drum rotatable about a rotation axis thereof in each of a succession of selected rotations thereof, said method comprising the steps of:
    scanning said laser beam from one side to another over said outer surface of said drum;
    sensing each occurrence of said laser beam leaving a scan reference location fixedly positioned with respect to said rotation axis of said drum in its said scanning at said laser beam over said outer surface of said drum;
    initiating a rotation of said drum from a selected rotation start position with respect to said rotation axis thereof substantially coinciding with a leaving of said scan reference location by said laser beam;
    sensing a selected rotation marker location on said drum passing a selected rotation reference location along that path followed by said reference marker location during a rotation of said drum; and
    permitting modulation of said laser beam to begin on a selected occurrence of said laser beam leaving said scan reference location after said rotation marker location on said drum has passed said rotation reference location as said laser beam substantially reaches said initial location on said outer surface of said drum.

2. The method of claim 1 wherein said rotation of said drum, after said initiating thereof, concludes with said drum returning to said selected rotation start position.

3. The method of claim i wherein said rotation of said drum, after said initiating thereof, begins with said drum going to said selected rotation start position before going on to complete said rotation.

4. The method of claim 1 wherein said step of scanning said laser beam from one side to another is accomplished through the further step of directing said laser beam onto a rotating reflector body having an outer surface comprising a plurality of facets such that said outer surface, in a cross section of said reflector body through said facets thereof perpendicular to said axis of rotation, forms a polygon.

5. The method of claim 1 wherein said step of permitting modulation of said laser beam to begin occurs on a first occurrence of said laser beam leaving said scan reference location after said rotation marker location on said drum has passed said rotation reference location.

6. The method of claim 1 wherein said step of sensing said laser beam reaching said scan reference location is accomplished by the further step of providing a photo-detector means at said scan reference location capable of converting electromagnetic energy from said laser beam to a corresponding electrical signal.

7. The method of claim wherein said outer surface of said drum is formed by an organic photoconductor material.

8. The method of claim 1 wherein said reference marker location has a reflective surface provided thereat, and wherein said rotation reference location has both a light beam emanating means and a light beam reception means provided thereat.

9. The method of claim 1 wherein said information modulation of said laser beam occurs in accord with a modulation signal based on data describing at least part of a graphic image.

10. The method of claim 2 wherein said drum is rotated by a stepper motor, said rotation marker location on said drum being a selected number of steps of said stepper motor from said selected rotation reference location if placed in said rotation start location.

11. The method of claim 3 wherein said drum is rotated by a stepper motor, said rotation marker location on said drum being a selected number of steps of said stepper motor from said selected rotation reference location if placed in said rotation start location.

12. The method of claim 4 wherein that said facet which first receives said laser beam after said rotation marker location on said drum passes said selected rotation reference location has a substantially identical angular relationship with said axis of rotation for at least four successive rotations of said drum in which said rotation marker location on said drum passes said selected rotation reference location in each of those said four rotations if made within a sufficiently short time.

13. A registration system for repeatably beginning modulation of a scanning laser beam at a selected initial location on an outer surface of a drum rotatable about a rotation axis thereof in each of a succession of selected rotations thereof, said system comprising:
    a scanning laser control system capable of providing said scanning laser beam scanning from one side to another over said outer surface of said drum;
    a laser beam position sensor capable of sensing each time said laser beam leaves a scan reference location at a fixed position with respect to said rotation axis of said drum in said scanning of said laser over said outer surface of said drum;
    a drum position sensor capable of sensing when a selected rotation marker location on said drum has passed a selected rotation reference location along that path followed by said reference marker location during a rotation of said drum; and
    a control means capable of being selectively directed to initiate, substantially coinciding with a leaving of said scan reference location by said laser beam, a rotation of said drum from a selected rotation start position into which said control means has directed said drum, said control means being further capable of directing modulation of said laser beam to occur after said laser beam position sensor provides an indication of a selected occurrence of said laser beam leaving said scan reference location following said drum position sensor providing an indication that said rotation marker location on said drum has passed said rotation reference location such that said laser beam substantially reaches said initial location on said outer surface of said drum.

* * * * *

UNITED STATES PATENT AND TRADEMARK OFFICE
CERTIFICATE OF CORRECTION

PATENT NO. : 5,083,140
DATED : January 21, 1992
INVENTOR(S) : Ronald C. Peterson et al.

It is certified that error appears in the above-identified patent and that said Letters Patent is hereby corrected as shown below:

Col. 9, line 28, delete "its".

Col. 9, line 29, delete "at" and insert --of--.

Col. 9, line 49, delete "claim i" and insert --claim 1--.

Col. 10, line 4, delete "claim" and insert --claim 1--.

Col. 10, line 46, after "laser", insert --beam--.

Signed and Sealed this

Twentieth Day of July, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,083,140

DATED : January 21, 1992

INVENTOR(S) : Peterson et al.

It is certified that error appears in the above-identified patent and that said Letters Patent is hereby corrected as shown below:

Col. 1, line 23, change "symmerty" to --symmetry--.

Col. 1, lines 44, 45, change "modulator" to --modulation--.

Col. 1, line 50, after "such", insert --colors. The changed areas remaining are then allowed to".

Col. 2, line 38, after "16", delete ",".

Col. 2, line 48, after "16", insert --on--.

Col. 3, line 28, after "motor", insert --11.--.

Col. 5, line 67, after "and", delete "o".

Col. 6, line 37, change "12''" to --12'''--.

Col. 8, line 42, change "41" to --4I--.

UNITED STATES PATENT AND TRADEMARK OFFICE
CERTIFICATE OF CORRECTION

PATENT NO. : 5,083,140
DATED : January 21, 1992
INVENTOR(S) : Ronald C. Peterson et al.

It is certified that error appears in the above-identified patent and that said Letters Patent is hereby corrected as shown below:

Col. 9, line 28, delete "its".

Col. 9, line 29, delete "at" and insert --of--.

Col. 9, line 49, delete "claim i" and insert --claim 1--.

Col. 10, line 4, delete "claim" and insert --claim 1--.

Col. 10, line 46, after "laser", insert --beam--.

Signed and Sealed this

Thirtieth Day of November, 1993

Attest:

BRUCE LEHMAN

Attesting Officer

Commissioner of Patents and Trademarks